United States Patent
Raghothaman et al.

(10) Patent No.: US 8,160,631 B2
(45) Date of Patent: Apr. 17, 2012

(54) POWER CONTROL FOR REVERSE LINK (75) Inventors: Balaji Raghothaman, Hollis, NH (US); Pierre A. Humblet, Cambridge, MA (US)

(73) Assignee: Airvana, Corp., Chelmsford, MA (US)

( * ) Notice: Subject to any disclaimer, the term of this patent is extended or adjusted under 35 U.S.C. 154(b) by 606 days.

(21) Appl. No.: 12/350,156

(22) Filed: Jan. 7, 2009

(65) Prior Publication Data
US 2010/0167778 A1 Jul. 1, 2010

Related U.S. Application Data (63) Continuation-in-part of application No. 12/346,272, filed on Dec. 30, 2008.

(51) Int. Cl.
*H04B 7/00* (2006.01)

(52) U.S. Cl. .............. 455/522; 455/67.13; 370/252

(58) Field of Classification Search .......... 455/313, 455/226.2, 126, 127.2, 450, 522; 370/252, 370/331
See application file for complete search history.

(56) References Cited

U.S. PATENT DOCUMENTS

| | | | |
|---|---|---|---|
| 5,369,789 A * | 11/1994 | Kosugi et al. | 455/126 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0079196 A1 * | 4/2006 | Atsumi | 455/313 |
| 2006/0084460 A1 * | 4/2006 | Matsuo et al. | 455/522 |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0246939 A1 * | 11/2006 | Zeller et al. | 455/522 |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |

(Continued)

OTHER PUBLICATIONS

3$^{rd}$ Generation Partnership Project "3GPP2", "cdma2000 High Rate Packet Data Air Interface Specification", C.S0024, version 4.0, Oct. 25, 2002 (548 pages).

(Continued)

*Primary Examiner* — Lana N Le
*Assistant Examiner* — Golam Sorowar
(74) *Attorney, Agent, or Firm* — Fish & Richardson P.C.

(57) ABSTRACT

A method performed in a wireless communication system having radio frequency burst transmission interference is presented. The method includes obtaining a first power level of noise and interference signals in an environment of at least one of a plurality of wireless communication devices serviced by an access point; and estimating a second power level by filtering the first power level.

18 Claims, 6 Drawing Sheets

U.S. PATENT DOCUMENTS

| | | |
|---|---|---|
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0207811 A1* | 9/2007 | Das et al. .................. 455/450 |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2007/0280170 A1* | 12/2007 | Kawasaki .................. 370/331 |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2010/0167777 A1 | 7/2010 | Raghothaman et al. |
| 2010/0167778 A1 | 7/2010 | Raghothaman et al. |

OTHER PUBLICATIONS

3rd Generation Partnership Project "3GPP2", "cdma2000 High Rate Packet Data Air Interface Specification", C.S0024-A, version 1.0, Mar. 2004 (1083 pages).

3rd Generation Partnership Project "3GPP2", "cdma2000 High Rate Data Air Interface Specification", C.S0024-A, version 2.0, Jul. 2005 (1227 pages).

3rd Generation Partnership Project "3GPP2", "cdma2000 High Rate Data Air Interface Specification", C.S0024-B, version 1.0, Apr. 2006 (1623 pages).

3rd Generation Partnership Project "3GPP2", "cdma2000 High Rate Data Air Interface Specification", C.S0024-B, version 2.0, Mar. 2007 (1627 pages).

USPTO Non Final Office Action in U.S. Appl. No. 12/346,272, mailed Jul. 21, 2011 (25 pages).

* cited by examiner

POWER CONTROL FOR REVERSE LINK

CROSS-REFERENCE TO RELATED APPLICATION

This application is a continuation-in-part (and claims the benefit of priority under 35 USC 120) of U.S. application Ser. No. 12/346,272, filed Dec. 30, 2008. The disclosure of U.S. application Ser. No. 12/346,272 is considered part of (and is incorporated by reference in) the disclosure of this application.

BACKGROUND

This description relates to reverse link power control in wireless networks.

Capacity of a wireless communication system may represent data throughput that can be supported by the system. Capacity can be an important factor for cellular service providers, because it directly impacts revenue. Code-Division Multiple Access (CDMA) wireless communications systems offer improved capacity and reliable communications for cellular and PCS systems.

In a CDMA system, each access terminal (AT) transmit signal utilizes a different pseudo random sequence signal that appears as noise to other ATs. This enables many ATs to transmit on the same frequency. However, each AT's transmitted signal contributes to interference in the transmitted signal of all other users. Thus, the total number of users supported by the system is limited by interference. Therefore, reducing the amount of interference in a CDMA wireless communications system increases capacity.

A typical problem in a CDMA cellular environment is the near/far problem. This entails the scenario where the transmit power of an AT near a radio node (RN) or a base station may drown out an AT which is far from the RN. This is effectively mitigated by controlling the transmit power of each AT via a power control scheme implemented by the access network (AN). AN continuously commands each AT to increase or decrease its transmit power to keep them all transmitting at the minimal power required to achieved the configured error rate for the operating data rate and maintain an overall balance of power while reducing the interference in the area of coverage.

In a CDMA 1x-EV-DO system (see e.g., CDMA2000 High Data Rate Packet Data Air Interface Specification, 3GPP2 C.S0024, Version 4.0, Oct. 25, 2002), the reverse link operates in CDMA and hence reverse link power control is needed.

SUMMARY

In general, in one aspect, subject matter described in this specification can be embodied in a method that is performed in a wireless communication system having radio frequency burst transmission interference. The method includes obtaining a first power level of noise and interference signals in an environment of at least one of a plurality of wireless communication devices serviced by an access point, and estimating a second power level by filtering the first power level.

Other implementations can optionally include one or more of the following features. The first power level may include a difference between a Received Signal Strength Indication (RSSI) and a sum of received power level of all wireless communication devices serviced by the access point. Filtering the first power level may include tracking a ramp-up of filtered noise and interference at an onset of a burst. Filtering the first power level may include providing a gradual damping of filtered noise and interference at the end of a burst. Filtering the first power level may include using a time-based filtering function. The method may also include determining a virtual pilot signal-to-interference-plus-noise-ratio (SINR) of the wireless communication system based on the second power level; and issuing a power level command to at least one of the plurality of wireless communication devices based on the virtual pilot SINR.

In general, in another aspect, subject matter described in this specification can be embodied in a method that is performed in a wireless communication system. The method includes determining a first power level for one or more wireless communication devices served by an access point and operating under a minimum power constraint, the first power level being a difference between a received power level from at least one wireless communication device and a second power level that would be received if the at least one wireless communication device were not under a minimum power constraint.

Other implementations can optionally include one or more of the following features. The method may also include obtaining a third power level of noise and interference signals in the environment of the one or more wireless communication devices serviced by the access point; and estimating a fourth power level by filtering the third power level. The method may also include determining a sum of the third power level and the first power level of all the wireless communication devices serviced by the access point. The method may also include setting a dynamic threshold value that is a product of a static rise-over-thermal threshold value and the sum, and setting a reverse activity bit when a Received Signal Strength Indication (RSSI) exceeds the dynamic threshold value.

In general, in another aspect, subject matter described in this specification can be embodied in a computer program product, encoded on a computer-readable medium, operable to cause data processing apparatus to perform operations including obtaining a first power level of noise and interference signals in an environment of at least one of a plurality of wireless communication devices serviced by an access point; and estimating a second power level by filtering the first power level.

Other implementations can optionally include one or more of the following features. The first power level may include a difference between a Received Signal Strength Indication (RSSI) and a sum of received power level of all wireless communication devices serviced by the access point. Filtering the first power level may include tracking a ramp-up of filtered noise and interference at an onset of a burst. Filtering the first power level may include providing a gradual damping of filtered noise and interference at the end of a burst. Filtering the first power level may also include using a time-based filtering function. The computer program product may also include determining a virtual pilot signal-to-interference-plus-noise-ratio (SINR) of the wireless communication system based on the second power level; and issuing a power level command to at least one of the plurality of wireless communication devices based on the virtual pilot SINR.

In general, in another aspect, subject matter described in this specification can be embodied in a computer program product, encoded on a computer-readable medium, operable to cause data processing apparatus to perform operations including determining a first power level for one or more wireless communication devices served by an access point and operating under a minimum power constraint, the first power level being a difference between a received power level from at least one wireless communication device and a second power level that would be received if the at least one wireless communication device were not under a minimum power constraint.

Other implementations can optionally include one or more of the following features. The computer program product may also include obtaining a third power level of noise and interference signals in the environment of the one or more wireless communication devices serviced by the access point; and estimating a fourth power level by filtering the third power level. The computer program product may include determining a sum of the third power level and the first power level of all the wireless communication devices serviced by the access point; setting a dynamic threshold value that is a product of a static rise-over-thermal threshold value and the sum; and setting a reverse activity bit when a Received Signal Strength Indication (RSSI) exceeds the dynamic threshold value.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

In wireless communication networks generally, the geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell." Macrocells can comprise one or several sectors by using multiple antennas. Within a macrocell area, one or more access points may be located to serve smaller geographic areas, referred to as "femtocell areas." An access point that serves a femtocell area is referred to as a "femtocell access point." A macrocell, for example, may provide coverage to an area of a few blocks, while a femtocell access point may provide coverage to an area spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor which may cause, e.g., service disruption (e.g., a dropped telephone call) to users of access terminals at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a home, an office, a public space, or a restaurant. For ease of description, private access points will be described hereinafter as femtocell access points or FAPs.

Figure 1:
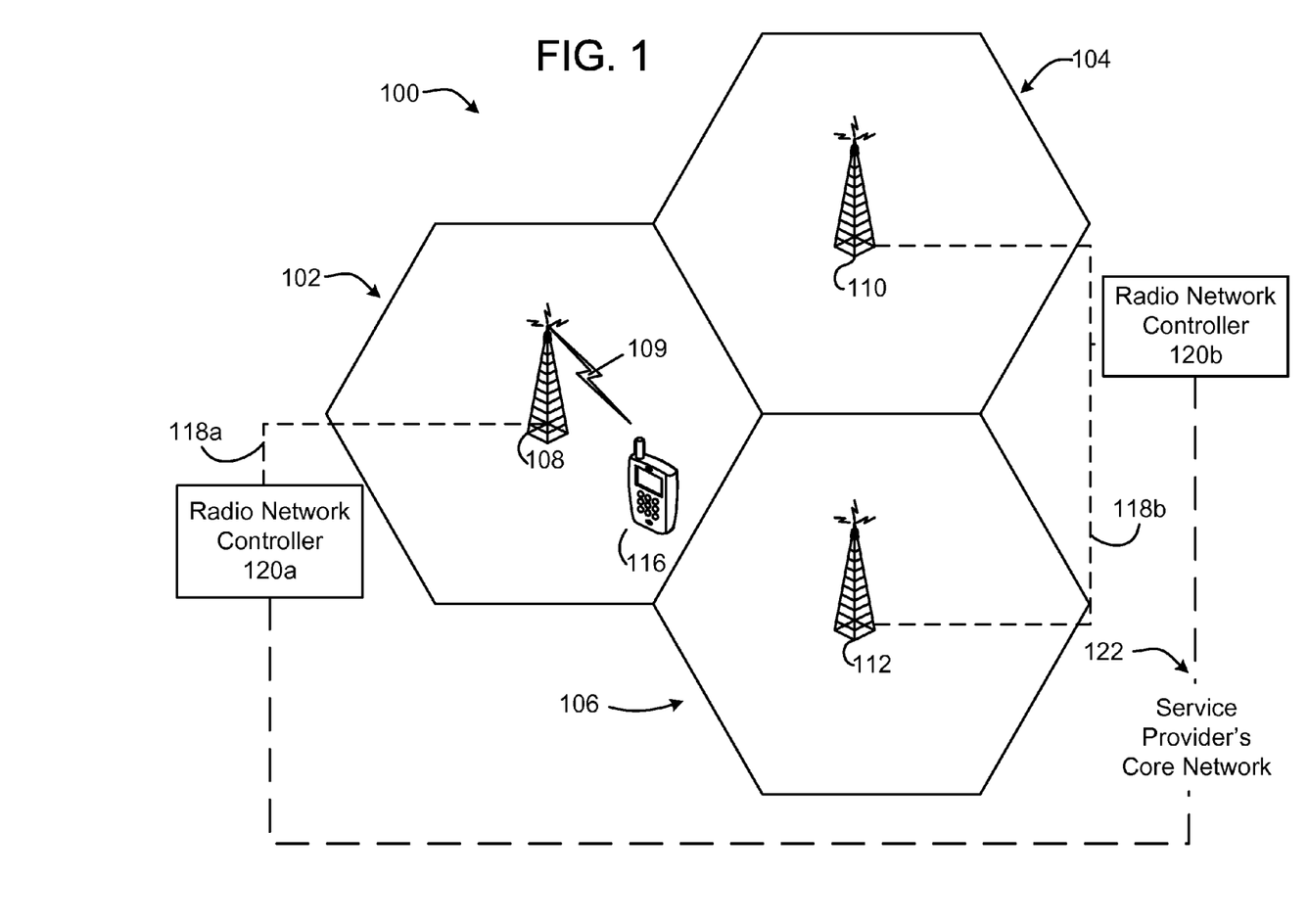
FIG. 1 is a diagram of a radio access network (RAN).

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can include one or more femtocell access points (FAPs). The macrocells 108, 110, and 112 are each configured to communicate with an access terminal over an airlink. For example, macrocell 108 communicates with access terminal (AT) 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include Universal Mobile Telecommunications System (UMTS) and Code Division Multiple Access (CDMA) 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1xEV-DO, CDMA2000, WiMax, WiBro, WiFi, and the like.

The following sections of the 3GPP Standard are hereby incorporated by reference in their entirety:

3GPP Technical Specification 25.331 version 8.3.0 Release 8, 2008-07, Universal Mobile Telecommunications System (UMTS); Radio Resource Control (RRC); Protocol specification;

3GPP Technical Specification 25.304 version 7.6.0 Release 7, 2008-07, Universal Mobile Telecommunications System (UMTS); User Equipment (UE) procedures in idle mode and procedures for cell reselection in connected mode;

3GPP Technical Specification 25.133 version 8.3.0 Release 8, 2008-06, Universal Mobile Telecommunications System (UMTS); Requirements for support of radio resource management (FDD);

3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
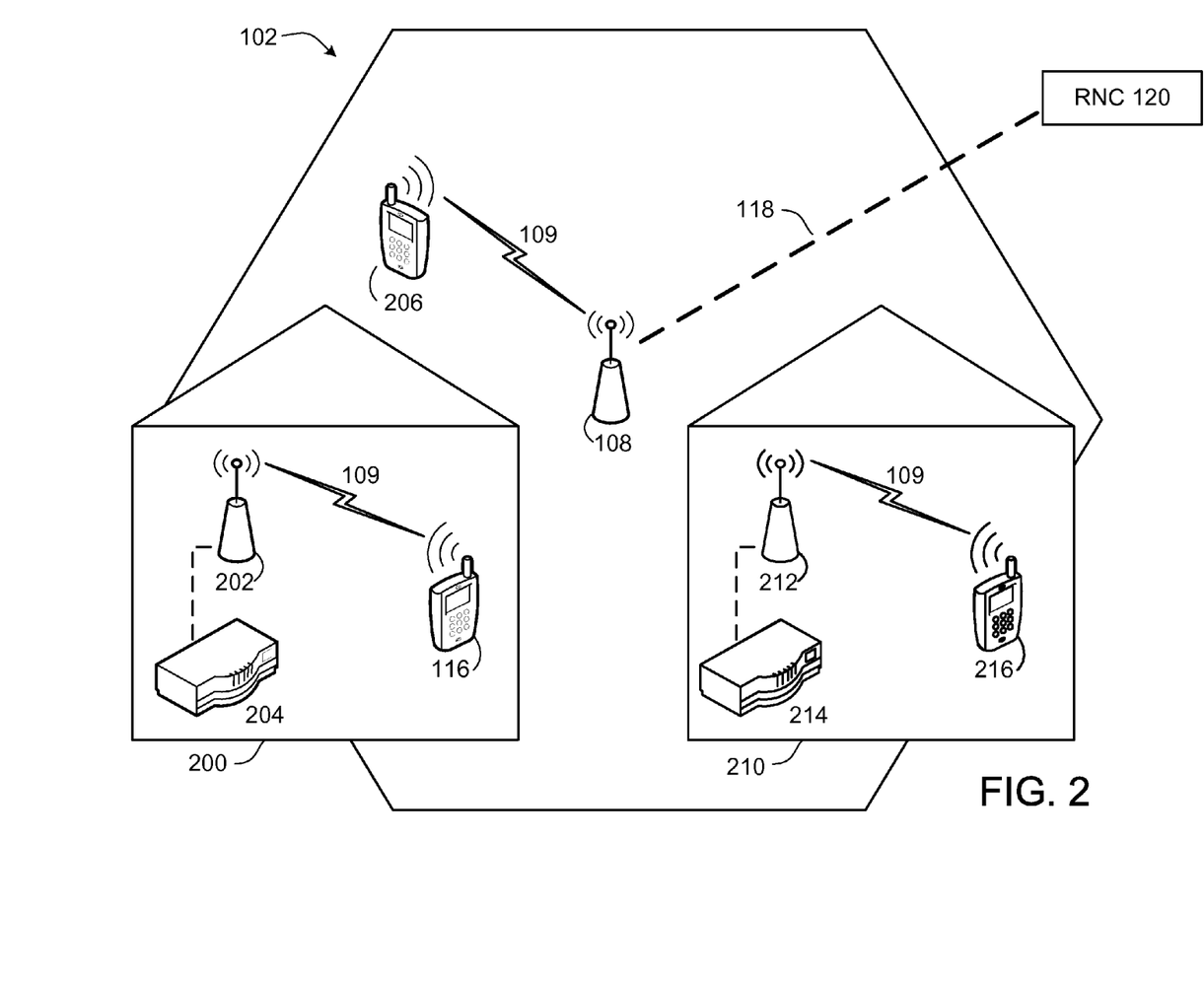
FIG. 2 is a diagram of a cell in the cellular network.

As shown in FIG. 2, a radio network access point 202 may be deployed in a user's home 200 in a similar manner as a WiFi® access point. Such a radio network access point is referred to as a private access point. The private access point 202 may use an available high-speed internet connection, such as a DSL or cable modem 204, as the backhaul, with the RNC functionality implemented in the private access point 202. Such a private access point may be installed anywhere, for example, in an office, a public space, or a restaurant. When this description refers to a private access point being in a "home," that encompasses any such location. Private access points may include, for example, femtocells or picocells. In some examples, a private access point may be integrated into a cable modem or other network hardware, such as a router or WiFi access point.

When an authorized access terminal, such as 116 shown in FIG. 1, is present inside the home (or anywhere within range of the private access point 202), it may use the private access point 202 in FIG. 2 rather than a regular cellular radio network access point, such as a base transceiver station (BTS) 108, to place or receive voice calls and data connections, even if the access terminal is otherwise within the cell 102 for that BTS 108. We therefore refer to BTS 108 as a macro BTS to distinguish it from a private access point, as macro BTS 108 provides direct access to the wider RAN. An access terminal 206 or macro AT may send signals to and receive signals from the macro BTS 108.

A neighboring home 210 may have its own private access point 212 connected to its cable modem 214 for use by its owner's authorized access terminal 216. Neighboring private access points may operate independently, in part because real-time communication is difficult between neighboring private access points. Private access points may also operate in a licensed spectrum. AT 116 and 216 are referred to as femto ATs that are served by 202 and 212, respectively. There is no communication between the macro RNC 120 and the femto ATs 116 and 216.

Figure 3:
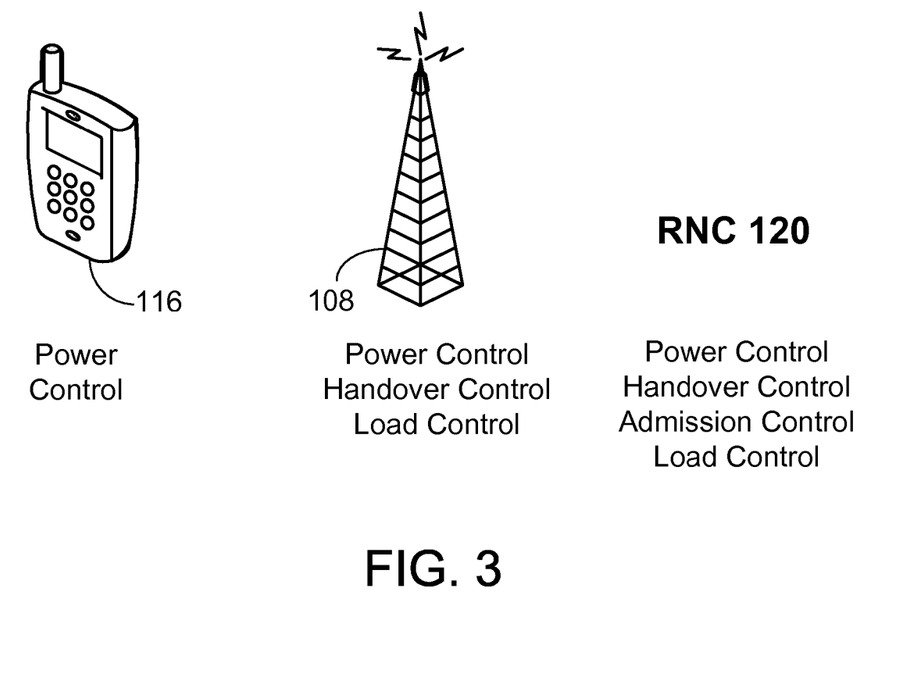
FIG. 3 is an illustration of RRM functionalities within a CDMA network.

In 3G networks, system level control of co-channel interference and other radio transmission characteristics is used and referred to as Radio Resource Management (RRM). RRM may include two parts: radio resource configuration and re-configuration. Specifically, radio resource configuration may be responsible for allocating the resource properly to new requests coming into the system so that the network is not overloaded and remains stable. However, as congestion might occur in 3G networks due to the mobility of users, radio resource re-configuration may be responsible for re-allocating the resource within the network when load is building up or congestion starts to appear. It is responsible for returning the overloaded system quickly and controllably back to the targeted load. RRM can be divided into power control, handover, admission control and load control functionalities at different locations within a CDMA network, as shown in FIG. 3 and some aspects will be described fully below.

Power Control

Power control in forward link and reverse link is one of the most important concepts in CDMA networks due to the interference-limited nature of CDMA. In some implementations, a reverse link power control scheme includes open loop power control (also referred to "autonomous power control") and closed loop power control. Open loop power control is used when a call is initiated. That is, ATs in idle mode autonomously set their power levels based on received signal strength from a BTS. Closed loop power control includes inner loop power control (ILPC) and outer loop power control (OLPC), both of which are usually performed by the access network. Generally speaking, the outer loop may evaluate the current frame error rate and adjust a target signal-to-interference-plus-noise ratio (SINR) threshold accordingly, based on the pilot signal from the AT. The normal SINR value usually lies in a fairly narrow range of a few dBs. In the inner loop, the BTS may compare the received signal level of each AT with the outer loop threshold in order to track the desired SINR and issue "Power Up" or "Power Down" command to the AT.

Minimum Power

An AT may not be able to keep reducing its transmit power indefinitely when receiving "Power Down" commands, since it is subject to a pre-defined "Minimum Transmit Power", below which the AT is not able to transmit. This condition can arise in femto cell networks where the AT is very close to the FAP. Consequently the SINR of an AT at a FAP can remain well above the normal SINR value. The minimum transmit power was designed to be small enough to ensure that the AT would not be reached in macro network operations where an AT is always at a significant distance from the base station.

Soft Handover

Mobile networks allow users to access services while on the move, thereby giving end users "freedom" in terms of mobility. However, this freedom may bring uncertainties to mobile systems. The mobility of the end users may cause dynamic variations both in the link quality and the interference level, sometimes requiring that a particular user change its serving base station. This process is known as handover. Handover deals with the mobility of the end users in a mobile network and it may guarantee the continuity of the wireless services when a mobile user moves across the cellular boundaries. In first and second generation mobile networks, hard handover is employed; in third generation networks, which are predominantly based on CDMA technology, the soft handover concept is introduced, where an AT can be served simultaneously by several BTSs. Compared with the hard handover, soft handover can achieve smoother transmission and less ping-pong effects (i.e., the phenomenon that, when a mobile moves in and out of cell's boundary, frequent hard handover occurs). In macro system, it has been shown that the individual link quality can be improved by soft handover. On a reverse link, macro ATs can be served simultaneously by several BTSs and all serving BTSs issue "Power Up" and "Power Down" commands. When the commands differ, the ATs obey the Power Down command so as to minimize reverse link power.

Reverse Activity Bit (RAB)

In a femto communication system, a radio node, such as base station 108 in FIGS. 1 and 2, can generally support a certain amount of data traffic in each sector for a particular bandwidth. The amount of data traffic supported by a radio node in a sector is referred to as the pole capacity. However, pole capacity is a theoretical maximum that is limited by radio frequency (RF) interference present in the sector, which may be caused by multiple ATs transmitting in the sector, ATs from adjacent sectors, and ATs from other networks. Accordingly, network designers often design radio access networks to limit the data traffic in a sector to maintain usage of the sector at some percentage of pole capacity, e.g., 50% or 75% of its pole capacity, which corresponds to some rise of the received signal at a base station (e.g., the Received Signal Strength Indication (RSSI)) over the baseline thermal power of a radio node's receiver for a sector (the ratio is referred to as "riseover-thermal" or simply ROT). ROT is a time-varying function that may be represented as a dimensionless quantity by the following equation:

$$ROT(t)=S(t)/N(t) \qquad \text{Eq. (5)}$$

where, S(t) is the total signal power received at time 't' at the radio node from all ATs in the sector (i.e., traffic power), and N(t) is the baseline noise power of the radio node's receiver at time 't'.

To ensure that a sector does not become overloaded, a radio access network can monitor the rise in thermal noise (ROT) at the radio receiver for each sector. If the ROT reaches some threshold value indicating that the sector is becoming overloaded, the radio access network will command the access terminals in the sector to reduce or freeze transmission power and/or transmission data rate. As the ROT falls below the threshold value, the network may authorize the ATs to increase power and/or transmission rate.

Figure 4:
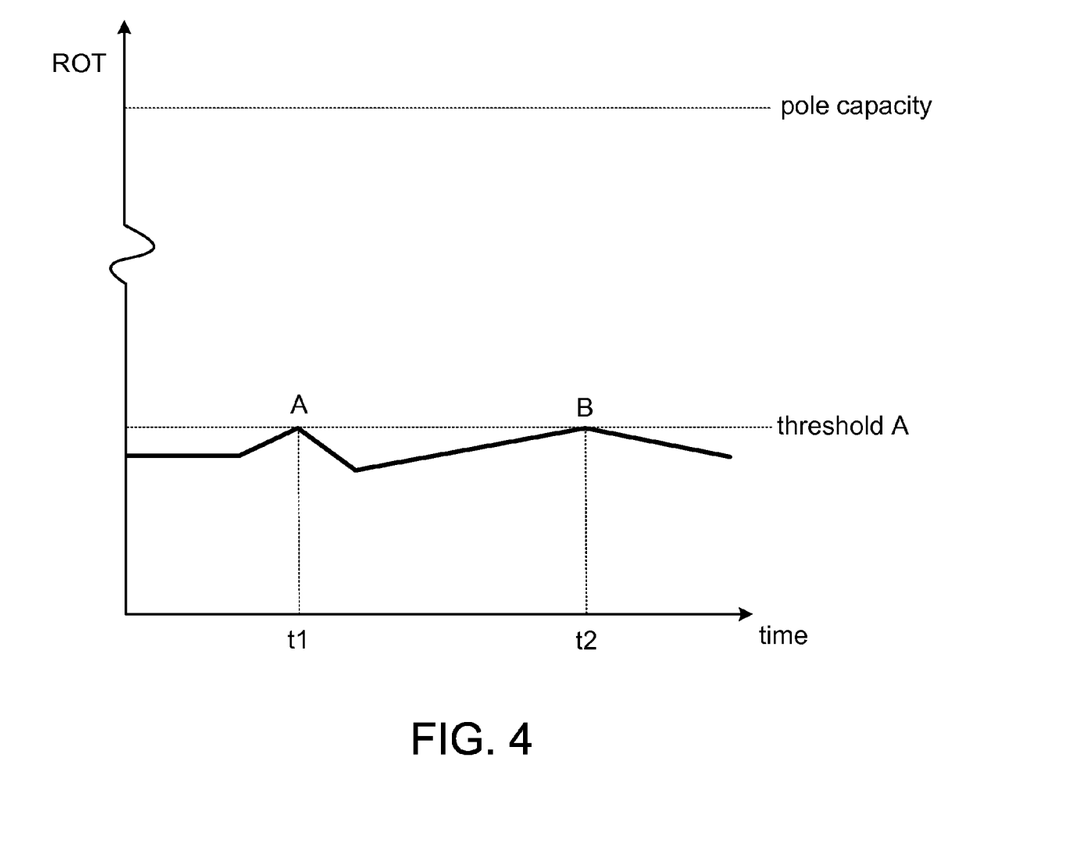
FIG. 4 is a graph charting ROT versus time in a sector of a radio access network.

For example, as shown in FIG. 4, a radio access network monitors ROT of a RN's radio receiver for a particular sector. If the ROT reaches a certain threshold A below the pole capacity of the sector (e.g., such as when the ROT reaches points A and B at times t1 and t2 respectively), the radio access network commands ATs within the sector to reduce or freeze their transmission power and/or transmission data rate. As the ROT falls below the threshold, the radio may permit ATs to increase their transmission power or rate. While a single threshold is illustrated in FIG. 4, in some implementations, a radio access network may be configured to have multiple thresholds which each trigger an increasingly stringent power control algorithm.

In a 1xEV-DO-compliant network, a wireless communication system can control transmission rate of ATs in a sector by setting (or clearing) the reverse activity bit (RAB) in the reverse activity channel on the forward link. Thus, for example, if the ROT value is at or above threshold A shown in FIG. 4, then the radio node for the affected sector sets the RAB. If the ROT value is below the threshold, the RAB is cleared. When an AT receives data on a multi-access communication channel with the RAB set, the AT becomes aware that the sector is over-loaded and executes an algorithm to determine whether to freeze or reduce its transmit rate. If the algorithm has a first outcome, the AT freezes its transmit rate. If the algorithm has a second outcome, the AT decreases its rate from its current rate to the next lowest rate defined by the 1xEV-DO standard. By reducing the rate at which ATs transmit on the reverse link, ATs transmit at less power and cause less interference in the sector, which decreases the ATs usage of the sector's capacity. When an AT is in soft handover, it receives RABs from all its serving BTSs and uses a restrictive setting.

Power Control Mechanism in UMTS

The Universal Mobile Telecommunication System (UMTS) is a third generation (3G) mobile communications system that provides a range of broadband services to wireless and mobile communications. The power of the reverse link pilot channel is controlled by OLPC and ILPC loops, following the same principles as in CDMA. However there is no direct equivalent to a RAB in UMTS. Instead, in some implementations, in particular High-Speed Uplink Packet Access (HSUPA), the UMTS uses a base station (BS)-driven (i.e., scheduled) approach in its uplink. That is, a UMTS BS may use an Access Grant Channel (AGCH) and/or Relative Grant Channel (RGCH) to allocate power for reverse link data transmission to one or more simultaneous operative ATs. Typically the scheduler insures that the power level of ROT (measured in dB) does not exceed a desired target level (e.g., a normal ROT target level might be 5 or 7 dB).

In a femto-macro CDMA system, various geographically dispersed FAPs can be transmitting signals at substantially the same time. These signals are received and combined at each individual AT in different sectors or cells. It is useful for each AT to determine received power on a per sector basis so that the AT can set a transmit power at a level that is not too high, thereby causing excessive interference, and not too low which might result in the FAP not receiving a signal from the AT.

While there is a certain amount of interference caused by background or thermal noise, the primary sources of interference with a particular AT's transmissions are other ATs in the same sector (i.e., in sector interference or intra-cell interference) or different sectors (i.e., out-of-sector interference or inter-cell interference). In particular, an AT's tolerance on inter-cell interference can impact the SINR thereby requiring proper power control. In macro networks this is done by using soft handover, which allows a base station to control ATs in neighboring sectors. However, soft handover is not used with femtocells and strong uncontrolled interference can originate from nearby ATs served by macro cells or by nearby FAPs.

In some implementations, it is also noted that bursty uplink interference (i.e., primarily out-of-sector inference ($I_{oc}$) may be present in transmissions from a macro AT connected to a macro cell, while impacting nearby femtocells and links to femto attached ATs. As explained above, if precautions are not taken, the RAB threshold may be triggered to force a particular AT exposed to strong interference to, e.g., its minimum data rate. This is especially true when a macro AT is nearby, i.e., a femto AT's performance can be greatly impacted. Generally, macro AT interference may be uncontrollable if there is no cooperation (e.g., soft handoff) between the femto ATs and macro ATs. Such interference can also vary in a wide range, and can be as high as 40 dB above the thermal noise level under some conditions.

Figure 5:
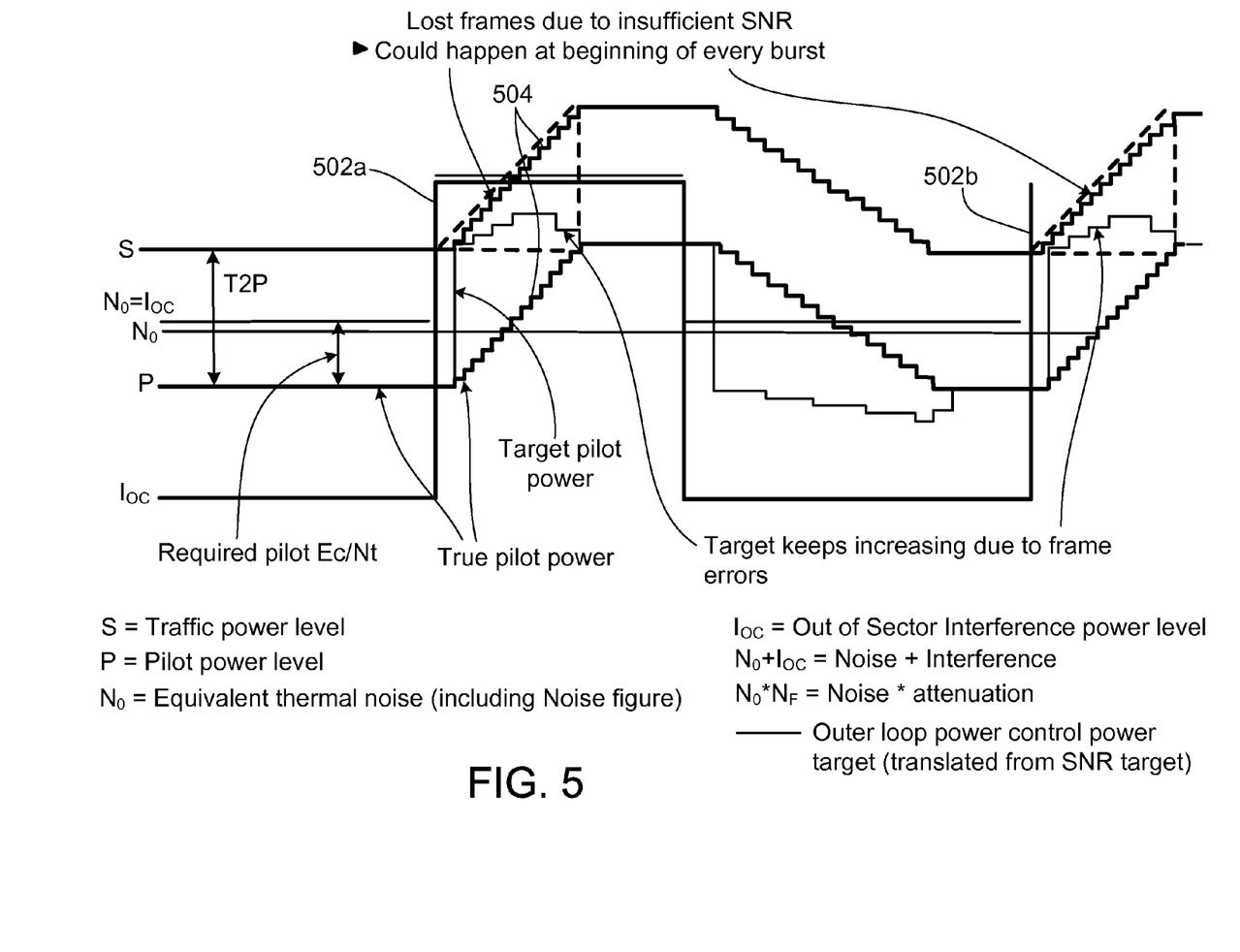
FIG. 5 is a graph in connection with issues when an access terminal operates in a strong busty interference environment.

As shown in FIG. 5, a macro AT may generate strong bursty interference. A femto AT may accordingly experience a rapid and dramatic power change of the out-of-sector interference $I_{oc}$ at the beginning of every burst (see, e.g., 502a, 502b), causing the SINR to be reduced. The femto AT may suffer lost frames due to insufficient SINR and call quality degradation. When coping with the bursty interference, a FAP may use the ILPC to try to maintain the SINR at a target level by issuing "Power Up" commands. This results in a gradual adjustment 504 to the AT transmission power level of, e.g., true pilot power and traffic power. This adjustment process, as illustrated in FIG. 5, is usually a function of time. Upon detecting frame errors, which usually occur at the beginning of a burst, before the AT power has had time to increase, the base station may also use the OLPC to raise the target SINR.

In some implementations, an out-of-sector interference signal level ($I_{oc}$), which also includes the thermal noise, may be obtained by subtracting from RSSI the estimated "in cell" received power as detailed in Eq. (1):

$$I_{oc}=RSSI-\text{InSectorLoad} \qquad \text{Eq. (1)}$$

where InSectorLoad is the sum of received powers of all ATs serviced by a FAP.

Figure 6:
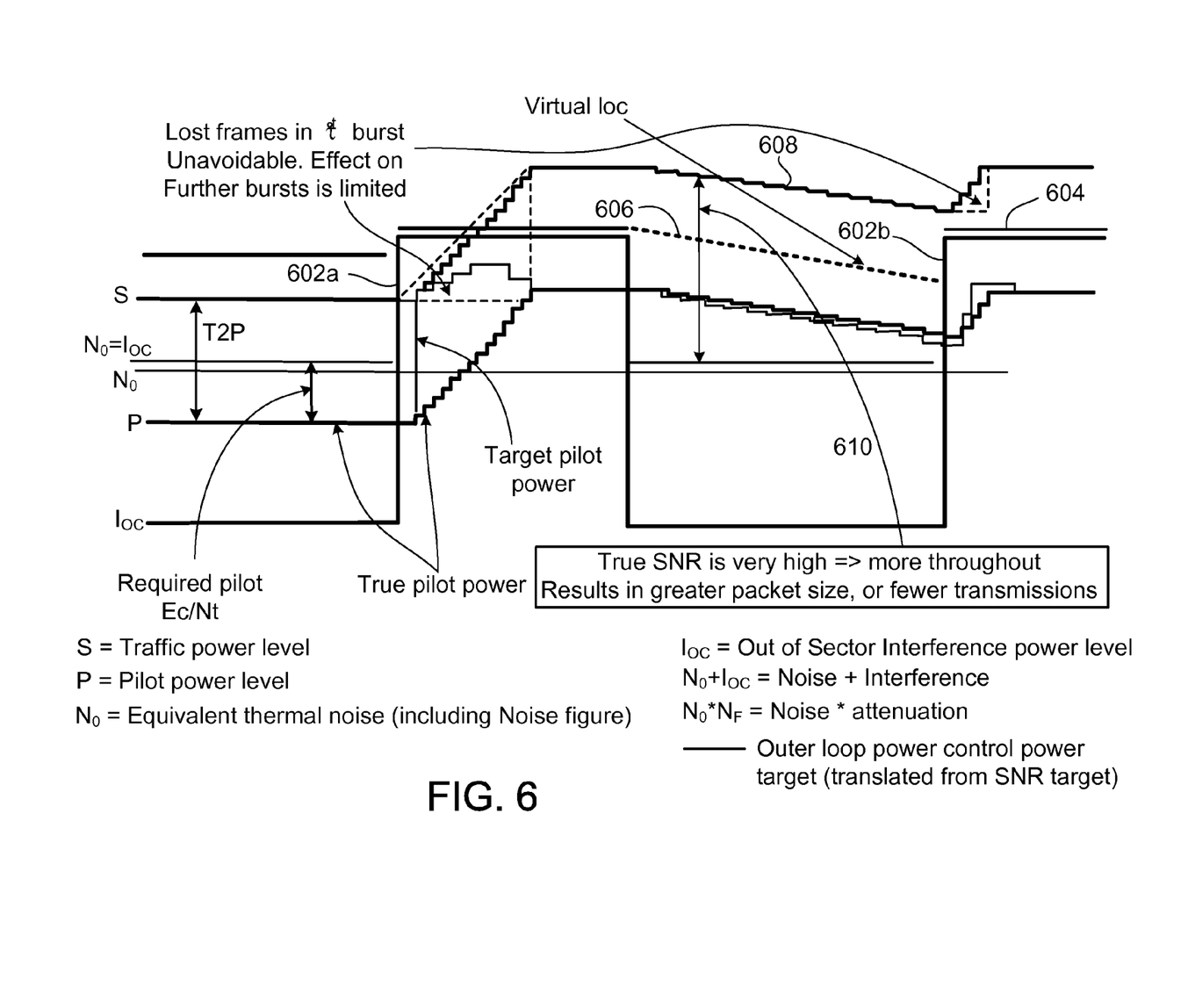
FIG. 6 is a graph in connection with a power control approach for an access terminal operating in a strong interference environment.

Referring to FIG. 6, in strong bursty traffic situations, more dynamic power control for each AT can be achieved by maintaining a virtual out-of-sector interference $vI_{oc}$ which is a filtered version of the actual $I_{oc}$ determined by Eq. (1):

$$vI_{oc}(k) = \max\left[\left(1 - \frac{1}{\tau}\right) \times vI_{oc}(k-1) + \frac{1}{\tau} \times I_{oc}(k), I_{oc}(k)\right] \quad \text{Eq. (2)}$$

where k denotes the time of the update.

The $vI_{oc}$ can be used for power control and to set the RAB, as explained below. Although lost frames in the first burst may not be avoidable, the adverse effect of subsequent transmission bursts can be limited by applying a slow roll-off of the characteristic function of interference estimation. When there is a sudden power increase at the beginning of a burst in $I_{oc}$ (e.g., 602a and 602b), Eq. (2) may ensure that the entire upswing 604 is incorporated in $vI_{oc}$ in subsequent transmission bursts. In addition, the filter function may ensure that power downswing 606 is gradual. The time constant ($\tau$) of the filter may be set based on the expected time period between bursts, for example, a hundred of millisecond. If $\tau=1$, the $vI_{oc}$ is the same as the $I_{oc}$. As shown in FIG. 6, due to the smooth filtering of the traffic power downswing 608, the true SINR 610 of the AT can be maintained at a very high level when the burst inference has disappeared. This enables the AT to be operating at a high enough power level, such that, if another burst of interference occurs within a short time-span, the AT is able to react quickly, without substantial loss of frames. One of the other consequences of operating at a high SINR during the time period after a burst has died down is that most of the data packets succeed much sooner than planned for, which results in a higher throughput. Using a time-based filtering technique to compensate the bursty unlink interference allows the femto AT to ramp up or ramp down the transmitted signal level smoothly over a finite time interval at the beginning and end of each burst. Other linear or non-linear filtering techniques can be explored and applied to achieve desired performance.

In addition, since power control is implemented on a per AT basis, a virtual pilot SINR (vPilotSINR) may be evaluated for each individual AT (e.g., a particular AT i) rather than the actual pilot SINR for inner loop power control (ILPC) of the reverse link:

$$vPilotSINR(i) = \frac{pilotRxPower(i)}{vI_{oc} + InSectorLoad - SelfLoad(i)} \quad \text{Eq. (3)}$$

where InSectorLoad is the obtained by measuring the sum of received power of all ATs serviced by the femto, and SelfLoad=received power from the particular AT i.

In addition, a new RAB threshold can be determined in connection with the $vI_{oc}$ in Eq. (2) as follows:

$$RABThreshold = (vI_{oc} + \Sigma_i ExcessPower(i)) \times RoTThreshold_{static} \quad \text{Eq. (4)}$$

where $RoTThreshold_{static}$ is a predetermined ROT threshold value (e.g., a linear value equivalent to 5-10 dB), and the term $\Sigma_i ExcessPower(i)$ is obtained by summing over all ATs serviced by the FAP.

For each AT i:

$$ExcessPower(i) = ExcessPilotPower(i) + ExcessTrafficPower(i), \quad \text{Eq. (5)}$$

$$ExcessPilotPower(i) = \quad \text{Eq. (6)}$$
$$\max\left(0, \left(PilotPower(i) - PilotPower(i) \times \frac{TargetPilotSINR}{PilotSINR(i)}\right)\right),$$

$$ExcessTrafficPower(i) = \quad \text{Eq. (7)}$$
$$ExcessPilotPower(i) \times TrafficToPilotRatio(PacketSize(i)),$$

Here, the TargetPilotSINR term in Eq. (6) is the typical SINR at which the pilot channel of an AT may be operating when the AT is operating above its minimum power, and the PilotSINR (i) is the SINR at which the pilot is currently being received. Hence the term $$PilotPower(i) \times \frac{TargetPilotSINR}{PilotSINR(i)} \text{ in Eq. (6)}$$

would be the typical pilot received power at the base station if the AT i was operating above its minimum power level. The difference between the PilotPower(i) and $$PilotPower(i) \times \frac{TargetPilotSINR}{PilotSINR(i)}$$

yields the ExcessPilotPower(i). The Max operation in Eq. (6) may restrict the ExcessPilotPower from being a negative number. Once the ExcessPilotPower for each AT is determined, the ExcessTrafficPower is also known based on Eq. (7) because the pilot and traffic power bear a deterministic relation at any given data packet size. As a result, the SINR per bit is practically maintained at a level appropriate to ensure a satisfactory throughput of the AT. A high throughput of the system may correspondingly result in a greater packet size or fewer transmissions.

Additionally, the granted power from a base station to an AT may take into account the interference potentially caused by the femto AT to neighboring macros and femtos, and make sure the interference is not excessive. Due to the effects of wireless propagation, the received signal power is a function of the separation between transmit and receive antennas. Intuitively, as the ATs move away from the base station, the average received power decreases. The received power at the base station expressed in terms of transmitted power is attenuated by a factor referred to as pathloss. In some implementations, an uplink data rate and power control scheme can estimate the path loss between the femto AT and the femtocells/macrocells using measurement reports from the femto AT. The power level of each femto AT power can be obtained either directly from measurement reports or indirectly by measuring the Dedicated Physical Control Channel (DPCCH) power at the FAP and the path loss between the FAP and the femto AT. Subsequently, the power control scheme can make sure the granted power and path loss does not exceed a predetermined threshold.

The virtual out-of-sector interference $vI_{oc}$ computation and use for power control in bursty interference environment is also applicable to UMTS and High-Speed Uplink Packet Access (HSUPA). For example, in HSUPA, $I_{oc}$ may be defined as the sum of the equivalent noise and the received power from UEs connected to the macro Node-Bs (i.e., base stations in UMTS) and other Home Node-Bs (HNBs) (i.e., a 3GPP's term for 3G femtocells), computed over one transmission time interval (TTI). Using a filtered version of the actual $I_{oc}$ shown in Eq. (2), HNBs may compute a virtual pilot SINR as given in Eq. (3) and use this value for inner loop power control. However, other suitable filtering functions may not be precluded.

The approach presented for excessive power computation in the case of an AT operating with reduced power may still be applicable to HSUPA. Rather than computing the RAB threshold in EV-DO, that approach can be modified to compute granted power. Specifically, in assigning power grants to multiple ATs, the HNB may need to recognize if some of them are transmitting at their minimum power and hence will be transmitting at a much higher SINR than necessary. The HNB may need to take into account the excess power when computing grants for the remaining ATs.

Although the techniques described above employ the 1xRTT, EV-DO, UMTS, and HSDPA air interface standards, the techniques are also applicable to other air interface technologies in which access terminals determine which access points to communicate with.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A method performed in a wireless communication system, the method comprising:
   determining a first power level for one or more wireless communication devices configured for operation under a power constraint;
   wherein the first power level comprises a difference between a power level of at least one of the one or more wireless communication devices under the power constraint and a second power level of the at least one of the one or more wireless communication devices independent of the power constraint;
   obtaining a third power level of noise and interference signals surrounding the one or more wireless communication devices;
   estimating a fourth power level by filtering the third power level;
   determining a sum of the fourth power level and the first power level;
   setting a dynamic threshold value that comprises a product of a static rise-over-thermal threshold value and the sum; and
   setting a reverse activity bit of the wireless communication system when a Received Signal Strength Indication (RSSI) of the wireless communication system exceeds the dynamic threshold value.

2. The method of claim 1, wherein the power constraint comprises a decreased power constraint relative to another power constraint of the wireless communication system.

3. The method of claim 1, wherein filtering comprises tracking a ramp-up of filtered noise and interference at an onset of a burst.

4. The method of claim 1, wherein filtering comprises providing a gradual damping of filtered noise and interference at an end of a burst.

5. The method of claim 1, wherein filtering comprises using a time-based filtering function.

6. The method of claim 1, further comprising:
   determining a virtual pilot signal-to-interference-plus-noise-ratio (SINR) of the wireless communication system; and
   issuing a power level command to at least one of the one or more wireless communication devices based on the virtual pilot SINR.

7. A non-transitory computer-readable storage medium configured to store instructions that are executable by one or more processors of a wireless communication system to perform operations comprising:
   determining a first power level for one or more wireless communication devices configured for operation under a power constraint;
   wherein the first power level comprises a difference between a power level of at least one of the one or more wireless communication devices under the power constraint and a second power level of the at least one of the one or more wireless communication devices independent of the power constraint;
   obtaining a third power level of noise and interference signals surrounding the one or more wireless communication devices;
   estimating a fourth power level by filtering the third power level;
   determining a sum of the fourth power level and the first power level;
   setting a dynamic threshold value that comprises a product of a static rise-over-thermal threshold value and the sum; and
   setting a reverse activity bit of the wireless communication system when a Received Signal Strength Indication (RSSI) of the wireless communication system exceeds the dynamic threshold value.

8. The non-transitory computer-readable storage medium of claim 7, wherein the power constraint comprises a decreased power constraint relative to another power constraint of the wireless communication system.

9. The non-transitory computer-readable storage medium of claim 7, wherein filtering comprises tracking a ramp-up of filtered noise and interference at an onset of a burst.

10. The non-transitory computer-readable storage medium of claim 7, wherein filtering comprises providing a gradual damping of filtered noise and interference at an end of a burst.

11. The non-transitory computer-readable storage medium program product of claim 7, wherein filtering comprises using a time-based filtering function.

12. The non-transitory computer-readable storage medium program product of claim 7, wherein the operations further comprise:
   determining a virtual pilot signal-to-interference-plus-noise-ratio (SINR); and
   issuing a power level command to at least one of the one or more wireless communication devices based on the virtual pilot SINR.

13. A wireless communication system comprising:
   one or more processors; and
   a non-transitory computer-readable storage medium configured to store instructions that are executable by the one or more processors to perform operations comprising:
      determining a first power level for one or more wireless communication devices configured for operation under a power constraint;
      wherein the first power level comprises a difference between a power level of at least one of the one or more wireless communication devices under the power constraint and a second power level of the at least one of the one or more wireless communication devices independent of the power constraint;
      obtaining a third power level of noise and interference signals surrounding the one or more wireless communication devices;
      estimating a fourth power level by filtering the third power level;
      determining a sum of the fourth power level and the first power level; setting a dynamic threshold value that comprises a product of a static rise-over-thermal threshold value and the sum; and
      setting a reverse activity bit of the wireless communication system when a Received Signal Strength Indication (RSSI) of the wireless communication system exceeds the dynamic threshold value.

14. The wireless communication system of claim 13, wherein the power constraint comprises a decreased power constraint relative to another power constraint of the wireless communication system.

15. The wireless communication system of claim 13, wherein filtering comprises tracking a ramp-up of filtered noise and interference at an onset of a burst.

16. The wireless communication system of claim 13, wherein filtering comprises providing a gradual damping of filtered noise and interference at an end of a burst.

17. The wireless communication system of claim 13, wherein filtering comprises using a time-based filtering function.

18. The wireless communication system of claim 13, wherein the operations further comprise:
   determining a virtual pilot signal-to-interference-plus-noise-ratio (SINR); and
   issuing a power level command to at least one of the one or more wireless communication devices based on the virtual pilot SINR.

* * * * *

UNITED STATES PATENT AND TRADEMARK OFFICE
CERTIFICATE OF CORRECTION

PATENT NO. : 8,160,631 B2
APPLICATION NO. : 12/350156
DATED : April 17, 2012
INVENTOR(S) : Balaji Raghothaman Page 1 of 1

It is certified that error appears in the above-identified patent and that said Letters Patent is hereby corrected as shown below:

Column 13, Line 57, In Claim 11, before "of claim" delete "program product".

Column 14, Line 2, In Claim 12, before "of claim" delete "program product".

Column 14, Line 31, In Claim 13, delete "rise-over- thermal" and insert -- rise-over-thermal --, therefor.

Signed and Sealed this
Twelfth Day of June, 2012

David J. Kappos
*Director of the United States Patent and Trademark Office*